Figure 1:
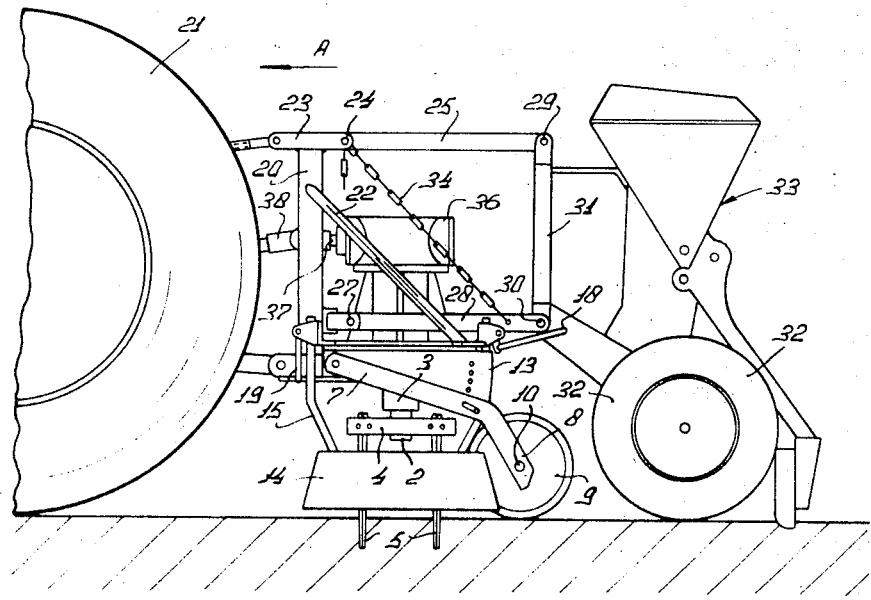

United States Patent [19]
Van Der Lely et al.

[11] 3,826,314
[45] July 30, 1974

[54] CULTIVATING IMPLEMENTS

[76] Inventors: Ary Van Der Lely, 10 Weverskade, Maasland; Cornelis Johannes Gerardus Bom, 36 Esdoornlaan, Rozenburg, both of Netherlands

[22] Filed: Apr. 24, 1972

[21] Appl. No.: 246,738

Related U.S. Application Data

[63] Continuation of Ser. No. 43,006, June 3, 1970, abandoned.

[30] Foreign Application Priority Data
June 10, 1969 Netherlands ..................... 6908785

[52] U.S. Cl. ................. 172/59, 172/112, 172/160, 172/439
[51] Int. Cl. .......................................... A01b 33/00
[58] Field of Search ....... 172/59, 112, 68, 523, 160, 172/668, 439, 776

[56] References Cited
UNITED STATES PATENTS

| | | | |
|---|---|---|---|
| 17,831 | 7/1857 | Glascock | 172/523 |
| 510,143 | 12/1893 | Kelsey | 172/59 |
| 2,582,364 | 1/1952 | Tice | 172/112 X |
| 2,609,215 | 9/1952 | Hancock | 172/668 |
| 3,508,617 | 4/1970 | Paynter | 172/68 |
| 3,542,133 | 11/1970 | Van Der Lely | 172/112 X |

FOREIGN PATENTS OR APPLICATIONS

| | | | |
|---|---|---|---|
| 6,714,826 | 5/1969 | Netherlands | 172/59 |
| 1,009,414 | 8/1956 | Germany | 172/160 |
| 847,413 | 9/1960 | Great Britain | 172/523 |
| 6,715,977 | 5/1969 | Netherlands | 172/59 |

*Primary Examiner*—Robert E. Pulfrey
*Assistant Examiner*—R. T. Rader
*Attorney, Agent, or Firm*—Mason, Mason and Albright

[57] ABSTRACT

A cultivator connectable to the three point lifting hitch of a tractor and having a plurality of side-by-side rotatable supports with tines. The frame has a trestle which connects to the tractor's hitch. The supports and tines are turnable about shafts and mounted in a row with vertically adjustable screens with locking guides located at each end of the row. The frame of the cultivator includes an upper and two lower arms connected to the tractor's three point hitch. A further implement, such as a seed drill machine has a further coupling trestle which can be pivotally connected to the arms and trails the tine supports. Also, a roller is adjustably mounted on the frame, immediately to the rear of the tine supports. The tines are tapered towards their bent-over tips and can be rectangular in section.

5 Claims, 5 Drawing Figures

INVENTORS
ARY VAN DER LELY
CORNELIS JOHANNES GERARDUS BOM
BY
Mason, Mason & Albright
Attorneys 3,826,314

CULTIVATING IMPLEMENTS

This is a continuation of application Ser. No. 43,006 now abandoned, filed June 3, 1970.

According to the invention, there is provided a cultivating implement or cultivator of the kind set forth, wherein the perpendicular distance between neighbouring non-horizontal axes is not greater than 30 centimeters, and wherein each soil-working member includes two tines that taper towards their tips, the angle of taper of each tine being not greater than 6°.

Figure 3:
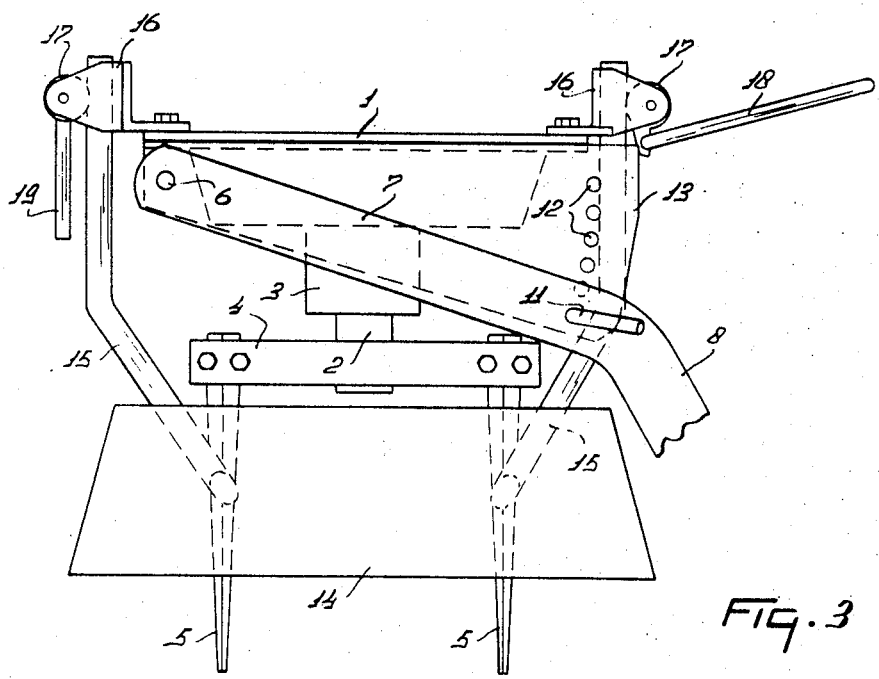
Figure 2:
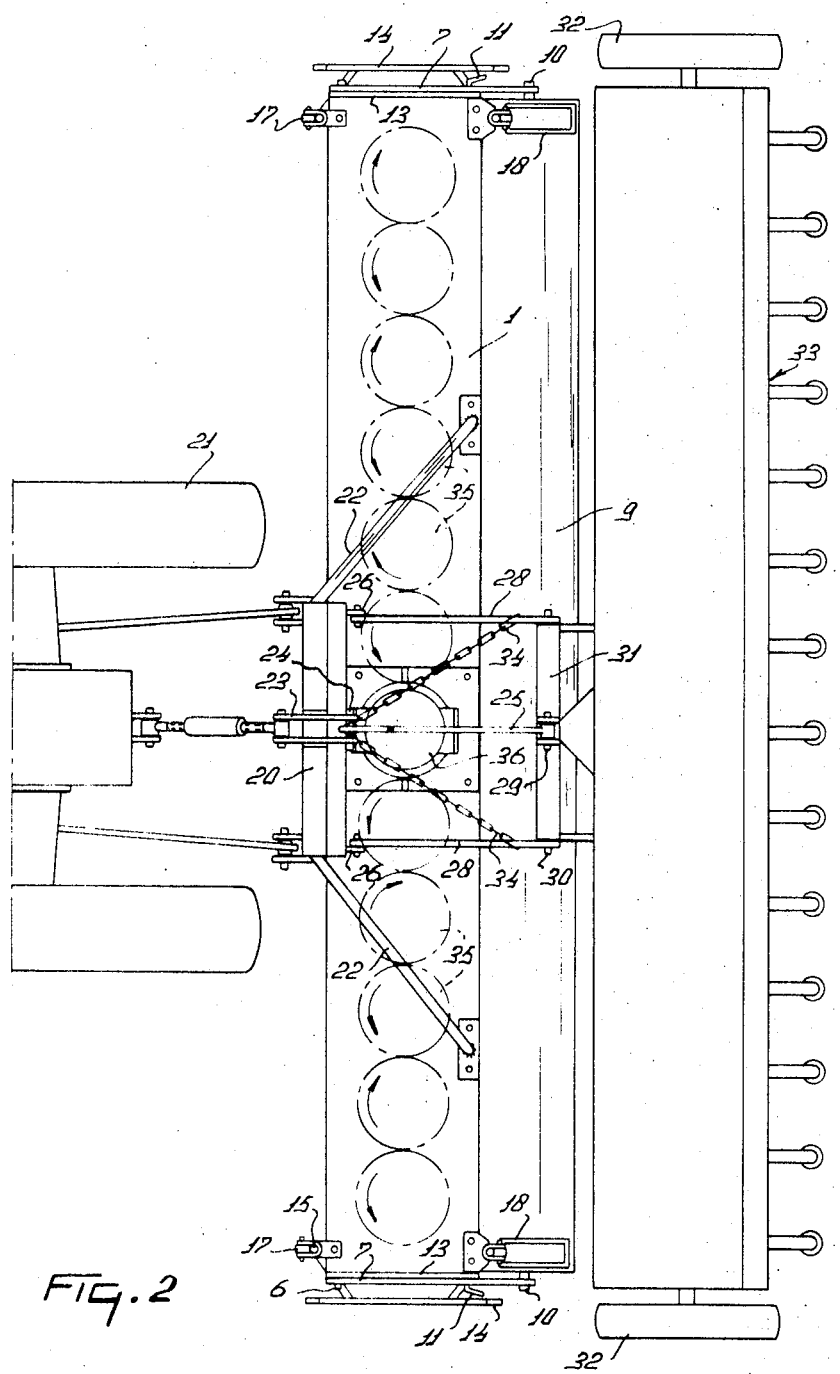
Figure 4:
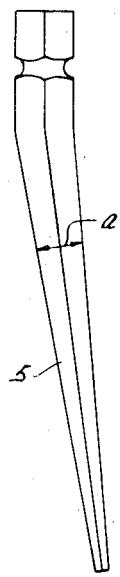
Figure 5:
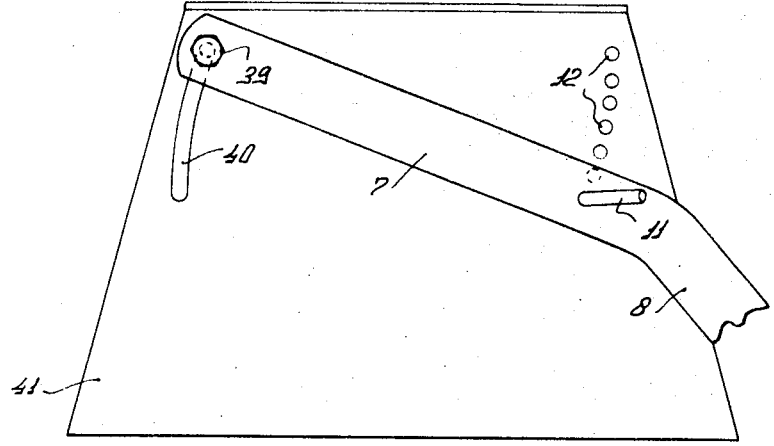

For a better understanding of the invention, and to show how the same may be carried into effect, reference will now be made, by way of example, to the accompanying drawings, in which:

FIG. 1 is a side elevation of a cultivating implement or cultivator in accordance with the invention coupled to the rear of an agricultural tractor, FIG. 2 is a plan view corresponding to FIG. 1, FIG. 3 is a side elevation showing adjusting mechanisms and other parts that can be seen in FIG. 1 of the drawings to an enlarged scale and in greater detail, FIG. 4 is a side elevation, to an enlarged scale, of a single cultivating tine of the implement, and FIG. 5 corresponds to FIG. 3 but shows an alternative construction.

Referring to FIGS. 1 to 4 of the drawings, the soil cultivating implement or cultivator which is illustrated has a mobile frame which is constituted principally by a main frame beam or casing 1 that is of hollow formation and that extends substantially horizontally perpendicular to the intended direction of operative travel of the implement which is indicated by an arrow A in FIG. 1 of the drawings. Twelve soil-working members are supported by the main frame beam 1 so as to extend in side-by-side relationship in a direction parallel to the length of the beam 1. Each soil-working member comprises a substantially vertical shaft 2 rotatably mounted in a corresponding substantially vertical bearing 3 and also a support 4 secured to the lower end of the shaft 2. The upper ends of cultivating tines 5 are releasably secured to the supports 4 and it will be seen from the drawings (and particularly from FIG. 4 thereof) that each tine 5 is of rectangular or other non-circular cross-section and tapers from its uppermost end to its lowermost tip. The angle of taper $a$ (FIG. 4) between the opposite edges of each tine 5 is quite small and preferably has a magnitude of not more than 6°. It can be seen from FIG. 2 of the drawings that each soil-working member is arranged to rotate in the opposite direction to its neighbour, or both its neighbours, by way of gearing contained within the hollow frame beam or casing 1. The tines 5 have lower portions which are gently bent-over relative to upper portions thereof and said tines are connected to their supports 4 in such a way that they trail when the soil-working members are rotated in the directions indicated by the arrows in FIG. 2. The tines 5 are secured to the supports 4 with the aid of the grooves that are formed in the upper portions thereof, one such groove being visible in FIG. 4 of the drawings. Each tine 5 preferably has a length of about 25 centimeters and the perpendicular distance between neighbouring shafts 2 is preferably also about 25 centimeters, the tines 5 of neighbouring soil-working members being arranged so that they work overlapping strips of ground during operation of the implement. It will, of course, be realised that there may, if required, be either more, or less, than the twelve soil-working members with which the example illustrated in the accompanying drawings is provided.

The uppermost ends of two arms 7 are pivotally connected to the opposite ends of the main frame beam or casing 1 towards the front of the latter (with respect to the direction A) by means of horizontally aligned pins 6. That end of each arm 7 which is remote from the corresponding pin 6 takes the form of a downwardly bent-over portion 8 and lowermost end regions of the two portions 8 have a roller 9 rotatably mounted between them with the aid of central stub shafts 10 of that roller. The axis of rotation afforded by the stub shafts 10 of the roller 9 is a substantially horizontal one extending parallel to the longitudinal axis of the main frame beam 1 and perpendicular to the direction A. An axially displaceable horizontal locking pin 11 is carried by each of the two arms 7 at a point adjacent the integral connection to the downwardly bent-over portion 8 of that arm. Each arm 7 is disposed alongside a corresponding vertical plate 13 mounted at one end of the main frame beam 1 and it will be seen from the drawings that each plate 13 is formed with a curved row of holes 12 with the center of curvature of the row coincident with the axis afforded by the aligned pins 6. The holes 12 are at the same distance from the pins 6 as the locking pins 11 and, therefore, the locking pins 11 can be entered in chosen ones of the holes 12 to maintain the arms 7 in corresponding angular settings about the axis afforded by the pivot pins 6. It will also be noted from the drawings that the plates 13 have inclined lower edges and thus have a much smaller vertical extent at the front (with respect to the direction A) than at the rear.

Screening plates 14 are connected to the opposite ends of the main frame beam or casing 1 with the aid of rods 15 whose uppermost ends are slidable upwardly and downwardly with respect to guides 16 mounted forwardly and rearwardly of the beam 1 with respect to the direction A. It will be evident that the screening plates 14 are normally disposed immediately above the ground surface during operation of the cultivator. The guides 16 are of channel-shaped formation, the upper ends of the rods 15 being received between the two flanges of the various channels. Eccentrics 17 of the disc-like formation are turnably mounted between the flanges of the channel-shaped guides 16 in such a way that the upper ends of the rods 15 are sandwiched between the eccentrics and the webs or bases of the guides 16. The leading eccentrics 17 with respect to the direction A carry handles 19 and the rearward ones carry brackets 18 and both said brackets 18 and handles 19 can be turned manually to cause the eccentrics 17 to clamp the upper ends of the rods 15 tightly in position with respect to the guides 16 and thus dictate the levels of the screening plates 14 with respect to the remainder of the cultivator.

A coupling member or trestle 20 is fastened to a central region of the front of the main frame beam or casing 1, said coupling member or trestle 20 being constructed for connection to the three-point lifting device or hitch of an agricultural tractor 21 or other operating vehicle in a generally known manner. Strengthening arms 22 rigidly interconnect an upper region of the trestle 20 and a rear edge region of the top of the main frame beam or casing 1. The arms 22 diverge relative to one another between the trestle 20 and the beam 1 and also extend downwardly from the trestle 20 to the beam 1. The coupling member or trestle 20 is provided centrally, and at its top, with a horizontally spaced apart pair of arms 23 that both extend parallel to the direction A. The leading ends of the arms 23 are arranged to have the upper lifting link of the three-point lifting device or hitch of the tractor 21 of other vehicle pivotally connected to them in known manner while their rearmost ends have one end of a coupling arm 25 turnably mounted between them with the aid of a horizontal pivot pin 24. The rear of the trestle 20 with respect to the direction A has two horizontally spaced apart lugs 26 projecting rearwardly from it and these two lugs 26 have the leading ends of two coupling arms 28 turnably connected to them with the aid of horizontally aligned pivot pins 27. The rearmost ends of the single upper coupling arm 25 and the two lower coupling arms 28 are turnably connected to the top and bottom respectively of a further coupling member or trestle 31 that is of approximately triangular configuration when seen in front, or rear, elevation. The pivotal connections between the arms 25 and 28 and the trestle 31 are afforded by an upper horizontal pivot pin 29 and a pair of horizontally aligned lower pivot pins 30.

The coupling member or trestle 31 is carried by the frame of a seed drill 33 that has its own large ground wheels 32. The seed drill 33 may be of generally known construction and, since such construction is not the subject of the present invention, no further detailed description of the seed drill 33 is considered to be necessary. It will be noted that, as seen in side elevation, the seed drill 33 is connected to the leading coupling member or trestle 20 by way of a parallelogram linkage that is angularly adjustable about the four axes afforded by the pins 24, 27, 29 and 30. However, the coupling arms 28 and the pivot pin 24 are interconnected by effectively flexible but inextensible members in the form of two chains 34. It will be apparent from the drawings that the chains 34 prevent the arms 25 and 28 from turning downwardly about the pins 24 and 27 beyond the angular settings dictated by the taut conditions of those chains. The chains 34 will usually be set so that the arms 28 cannot normally turn downwardly about the pins 27 beyond a substantially horizontal disposition. The gearing that is provided internally of the main frame beam or casing 1 to operate the soil-working members takes the form of a row of intermeshing pinions 35 (FIG. 2) while the central shaft 2 of one of the two middle soil-working members of the row has an upward extension into a gear box 36 that is provided with a rotary input shaft 37 that projects forwardly from said gear box in the direction A. An intermediate telescopic transmission shaft 38 of generally known construction having universal joints at its opposite ends is arranged to place the input shaft 37 of the gear box 36 in driven connection with the power take-off shaft of the tractor 21 or other vehicle.

FIG. 5 of the drawings illustrates an alternative construction in which substantially vertically disposed trapezoidal plates 41 are secured to the opposite ends of the main frame beam or casing 1. A finer adjustment of the vertical setting of the roller 9 is possible with this construction since the pivot pins 6 are replaced by pivot bolts 39 that are displaceable along curved slots 40 formed through said plates 41, said bolts 39 being arranged so that they can be tightened to retain them in any chosen settings lengthwise of the slots 40. With this arrangement, the axis about which the arms 7 are turnable with respect to the frame of the implement is itself displaceable with respect to that frame. The centers of curvature of the slots 40 are, of course, coincident with the holes in the arms 7 through which the horizontal locking pins 11 are entered for co-operation with the holes 12 that, in this case, are formed through the trapezoidal plates 41.

In the use of the cultivating implement or cultivator which has been described, the coupling member or trestle 20 is connected to the three-point lifting device or hitch of the tractor 21 or other vehicle and the intermediate transmission shaft 38 is used to place the soil-working members of the cultivator in driven connection with the power take-off shaft of the same tractor 21 or other vehicle. As the cultivator is moved over the ground in the direction A, the rotating tines 5 break up the soil, their working depth being determined principally by the level of the axis of rotation of the roller 9 with respect to the remainder of the implement, the locking pins 11 or the locking pins 11 and the pivot bolts 39 determining this level. Much of the weight of the cultivator is sustained from the ground by the roller 9 and it will be evident that this roller flattens the soil that has just been broken up by the tines 5. The roller 9 thus has a crumbling effect upon lumps of soil and produces a finely divided seed bed. The coulters of the seed drill 33 sow the required seed directly into the seed bed produced by the immediately preceding tines 5 and roller 9. The moving parts of the seed drill 33 can be driven, in known manner, from the ground wheels 32 thereof.

The vertically disposed screening plates 14 at the opposite ends of the main frame beam or casing 1 prevent soil displaced by the tines 5 from being thrown laterally of the cultivator to any appreciable extent and it will be remembered that said screening plates 14 can be moved upwardly and downwardly to match adjustments of the settings of the arms 7 about the pivot pins 6 or pivot bolts 39 by operating the brackets 18 and handles 19 to free the upper ends of the rods 15 from the eccentrics 17, moving the rods 15 upwardly or downwardly as may be required and subsequently returning the eccentrics 17 to their clamping positions. The tines 5 of the soil-working members are long and slender and their previously described trailing disposition is conducive to the best possible crumbling of the soil which they work. The upper portions of the tines 5 rotate through circles having diameters of approximately 25 centimeters. When the construction illustrated in FIG. 5 is employed, coarse adjustment of the level of the axis afforded by the stub shafts 10 relative to the frame is effected by entering the locking pins 11 in different ones of the holes 12 while fine adjustment is effected by loosening the pivot bolts 39 and turning the arms 7 slightly about the aligned locking pins 11 until the desired setting is reached after which the pivot bolts 39 are re-tightened.

When the cultivating implement or cultivator is to be moved from one place to another without performing any cultivating operation, the three-point lifting device or hitch of the tractor 21 or other vehicle is raised to bring the soil-working members and roller 9 well clear of contact with the ground together with the seed drill 33 which, it will be remembered, cannot turn downwardly about the pivot pins 24 and 27 beyond the angular position dictated by the taut lengths of the chains 34. Thus, the coupling arms 25 and 28 form the sole support of the seed drill 33 during non-operative transport thereof. It will also be noted that the chains 34 prevent the coupling arms 28 from bearing against the upper surface of the hollow main frame beam or casing 1 since this would, in time, tend to deform or otherwise damage the beam or casing 1.

The cultivating implement or cultivator that has been described is constructed and arranged for substantially central working with respect to the path of travel of the operating tractor 21 or other vehicle. If off-set working with respect to said path of travel is desired, then the main frame beam or casing 1 may be provided with an additional coupling member or trestle at or near one of its ends so that the implement will project to only one side, rather than both sides, of the path of travel of the tractor 21 or other vehicle. Instead of employing the seed drill 33, some other form of planting machine may be mounted at the rear of the cultivator or a fertilizer distributing machine or a combined seed drill and fertilizer distributing machine may take its place.

Having thus described my invention, what I claim as new and desire to secure by Letters Patent of the United States is:

1. A cultivating implement for attachment to a lifting hitch of a tractor comprising a frame and a row of side-by-side rotatable tine support members, said support members each being rotatable about an upwardly extending shaft and said frame comprising an elongated and horizontally extending main beam which houses a drive mechanism connected to the shafts of said support members and said main beam extending generally transverse to the direction of intended travel, said main beam having a forward three point coupling member which extends above said beam and pivotally interconnects the implement to said hitch, a further coupling member positioned to the rear of said main beam for connection to a trailing agricultural device, arm means interconnecting said coupling members to maintain same in relative position with respect to one another, said arm means comprising substantially horizontal support arms which pivotally connect said forward coupling member with said further coupling member and said support arms including a pair of lower coupling arms located at generally the same level and a single upper coupling arm positioned at a higher level and approximately mid-way between said two lower arms when the implement is viewed in plan, said arms extending above and across said main beam, at least one flexible stop interconnecting said upper and lower arms to prevent movement of said arms beyond a predetermined limit, whereby the implement and device can be raised with the lifting hitch without the arms bearing on the main beam.

2. The implement of claim 1, wherein two flexible stops interconnect the upper arm with the lower arms.

3. The implement of claim 2, wherein a forward end of each stop extends from adjacent a pivot connection of the upper arm with the forward coupling member, downwardly to adjacent a pivot connection of a lower arm with the further coupling member.

4. The implement of claim 1, wherein said coupling member is a triangular shaped trestle and the upper lifting link of said hitch is connected to the top of said trestle.

5. The implement of claim 4, wherein strengthening arm means connects said trestle adjacent its top to said main frame beam.

* * * * *